April 25, 1967   J. G. FRANCOIS   3,315,769
SELF-ENERGIZING CALIPER TYPE DISC BRAKE
Filed June 3, 1965   2 Sheets-Sheet 1

INVENTOR
JEAN GEORGES FRANCOIS
By Irwin S. Thompson
ATTY.

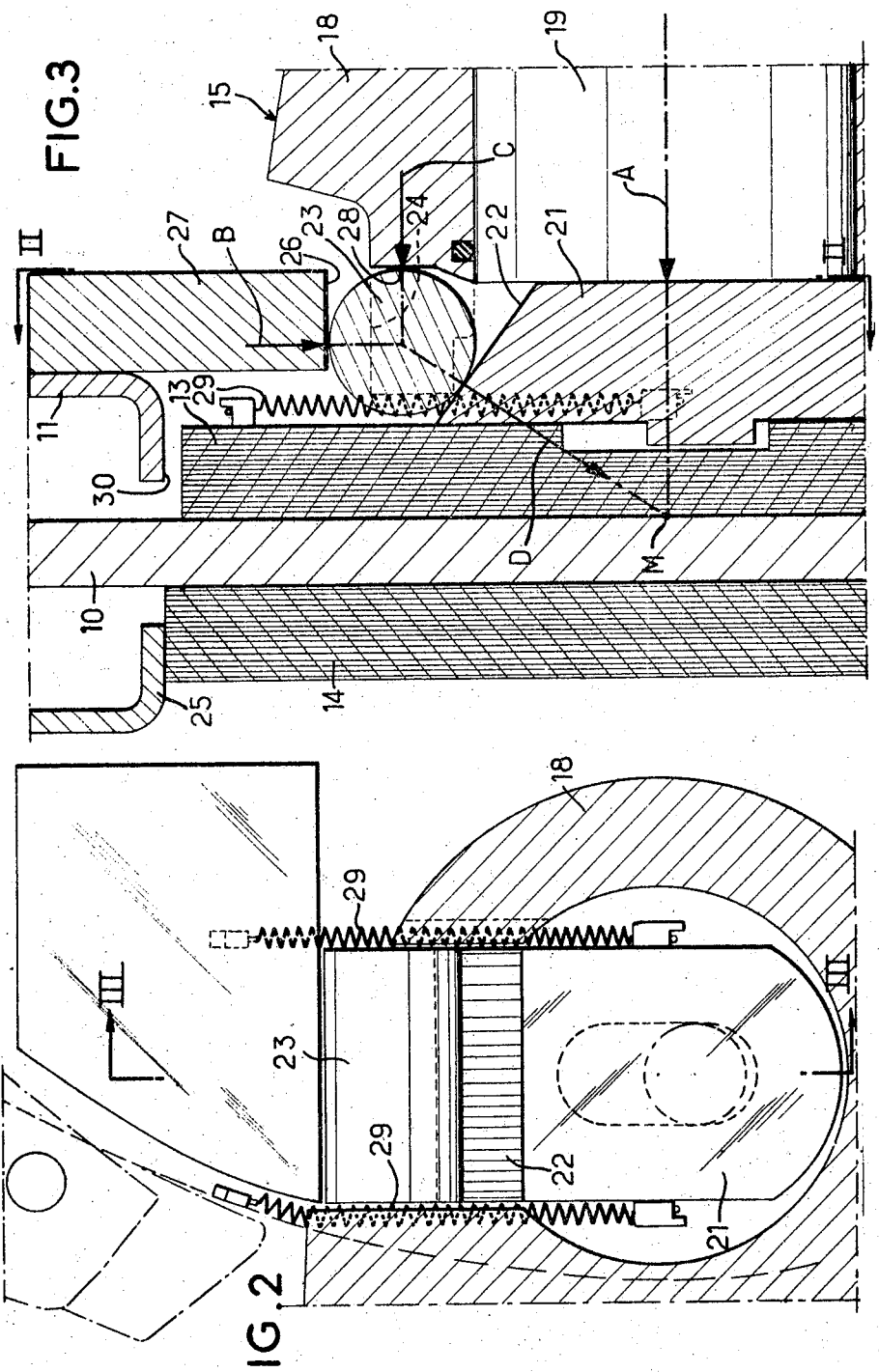

United States Patent Office 3,315,769
Patented Apr. 25, 1967

3,315,769
SELF-ENERGIZING CALIPER TYPE DISC BRAKE
Jean Georges Francois, Blanc-Mesnil, France, assignor to Societe Anonyme Francaise du Ferodo, a corporation of France
Filed June 3, 1965, Ser. No. 461,100
Claims priority, application France, June 15, 1964, 978,261
8 Claims. (Cl. 188—73)

The present invention relates to disc brakes, especially for automotive vehicles, comprising a disc rigidly fixed for rotation with a wheel, two friction shoes arranged on each side of said disc, a transfer member mounted floating with respect to a fixed support, especially movable in a direction parallel to the axis of the disc and mounted astride the two shoes, the said transfer member forming a hydraulic cylinder adapted to grip the shoes against the two faces of the disc.

In general, with brakes of this type, the shoes which tend to be carried away by the disc at the moment of braking come into application against abutments of the fixed support. The brake-actuating force which is developed by the hydraulic cylinder is thus not assisted by the braking reaction, which is the case for example in self-tightening drum-brakes.

The present invention has for its object improvements in disc brakes, permitting disc brakes of this kind to be assisted by the braking reaction, that is to say self-tightening, together with a simple and convenient construction.

In accordance with the invention, at least one of the shoes is associated with a sloping face which cooperates with a distribution member, the latter coming into abutment, both with the fixed support, along one face of this support substantially perpendicular to the plane of the disc, and on the transfer member, along one face of this latter substantially parallel to the plane of the disc. This distribution member thus has three working contacts, associated respectively with the sloping face, the fixed support and a transfer member. The distribution member can have any appropriate section, triangular, polygonal, round or other. This member is advantageously rounded at its zones of contact with a large radius of curvature.

In one form of construction of the invention, only one of the shoes is arranged in the manner which has just been indicated, while the other shoe cooperates simply in abutment against the fixed support. Even in this case, the self-gripping effect is obtained on both shoes, since the reaction is transmitted by the transfer member to both shoes.

The transfer member is preferably provided with a notch for housing the distribution member such as a roller, for the purpose of reducing as far as possible the size of the assembly.

By virtue of the arrangement according to the invention, a self-gripping effect is obtained by a contribution from the breaking reaction, through the intermediary of the distribution member and the sloping face, on the braking force of the shoes on each side of the disc. The amount of self-gripping force can be chosen to be more or less great as a function of the conditions of use, by virtue of a more or less accentuated inclination of the sloping face.

In another form of the invention, for the purposes of automatic compensation of the play due to wear, and an automatic take-up of the positioning of the shoe associated with the sloping face, in spite of the said sloping face, the latter is provided on a separate part of the shoe with which it is associated, this part being coupled to the said shoe by elastic means, for example by a pair of springs.

In the unbraked position, these springs tend to cause the part carrying the sloping face to move forward with respect to the shoe. The latter can cooperate with a rear abutment intended to permit braking during reverse running. This abutment while at rest receives the shoe which moves back under the effect of the above-mentioned spring. At the point of this abutment and at the place of the zones of application of the distribution member, this spring maintains permanent contacts which define a position of rest which always remains the same irrespective of the wear. In the position of braking, the hydraulic force and the self-gripping force render the part carrying the sloping face fixed to the shoe by friction, and the operation is similar to that which has been indicated above.

This condition necessitates a strong adhesion under load of the assembly (sloping-face member and shoe), which can be effected according to the invention by very rough states of surface, grooved for example, or by powerful friction linings on one of the parts or by an inclined coupling plane, or by any other appropriate means. In this way, it is possible to make use of a coupling force greater than the driving force applied by the disc, and this is all the more simple since the coupling is static.

According to a still further characteristic feature of the invention, the shoe with which the sloping face is associated is preferably adapted to come into safety application against a fixed support abutment, in the case where the coupling between the said shoe and the sloping-face member were to give way.

According to the invention, it is possible, by an appropriate choice of the adhesion between the shoe and the sloping-face member to arrange either that the adhesion coupling between the two parts does not give way during the whole period of normal working, which prolongs the self-gripping effect during the entire braking period, or on the contrary that the said coupling gives way and the shoe comes into application against the fixed safety abutment. In this case there is obtained an amplification effect with a linear characteristic.

The objects, characteristic features and advantages of the invention will further be brought out in the description which follows below of forms of construction chosen by way of example, reference being made to the accompanying drawings, in which:

FIG. 2 is a view on a larger scale of this disc brake looking in the direction of the arrows II–II of FIG. 3;

FIG. 3 is a corresponding view in cross section, taken along the arrows III—III of FIG. 2.

Figure 1:
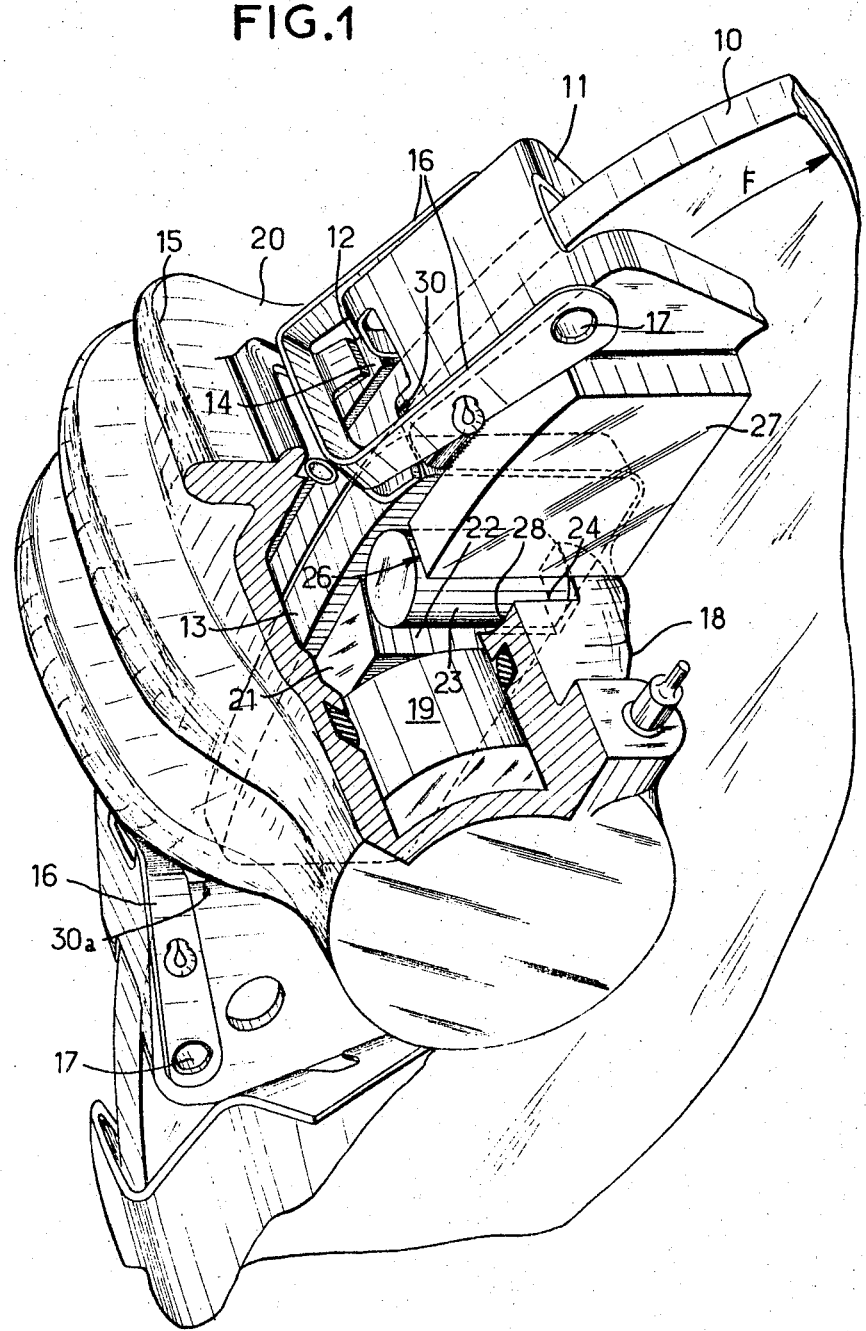
FIG. 1 is a view in perspective, with parts broken away, of a disc brake in accordance with the invention.

In the form of construction shown in FIGS. 1 to 3, the disc brake comprises a disc 10 fast for rotation with a wheel of an automotive vehicle (the arrow F in FIG. 1 indicates the direction of rotation for forward running), and a fixed support 11 having a wide notch 12 in which are housed the friction shoes 13 and 14 intended to cooperate frictionally with the two faces of the disc 10.

A floating transfer member 15 is fixed by arms 16 pivotally mounted at 17 on the support 11. The transfer member 15 which has thus a latitude of movement, especially parallel to the axis of the disc 10, spans the shoes 13 and 14. The transfer member 15 forms a cylinder 18 in which slides a piston 19 intended to actuate the shoe 13, while the other shoe 14 is received in abutment against a fixed part 20 of the transfer member 15.

According to the invention, a part 21 is interposed between the piston 19 and the shoe 13 and comprises a sloping face 22 cooperating with a roller 23 engaged in a housing 24 of the cylinder 18. The other shoe 14 is intended to come simply into application against an abutment 25 of the fixed support 11.

In operation, when the piston 19 is actuated by the pressure in the cylinder 18, the member 21, carried forward by the rotation of the disc 10, applies a thrust against the roller 23 which transmits this thrust, on the one hand to a face 26 perpendicular to the disc 10 of a part 27 rigidly fixed to the support 11, and on the other hand to a face 28 parallel to the disc 10 of the housing 24 formed in the cylinder 18.

It follows that during the actuation of the shoes 13 and 14, the member 21 tends to transmit the tangential driving movement of the disc 10 to the roller 23 which, by the action of the supports at 26 and 28, tends to clamp the disc 10 harder between the shoes 13 and 14.

By virtue of the construction which has just been described, this disc brake thus has self-gripping characteristics.

The part 21 may be either rigidly fixed to the shoe 13 or, preferably, as shown in FIGS. 2 and 3, it may be coupled to the shoe 13 by means of a pair of springs 29 intended to compensate automatically the play of the shoes 13 and 14 due to wear.

In the unbraked position, the springs 29 tend to move forward the part 21 carrying the sloping face 22 with respect to the shoe 13. The latter can cooperate with a rear abutment 30a (FIG. 1), intended to permit braking during reverse running. At rest, the abutment 30a receives the shoe 13 which moves back under the effect of the springs 29. In the gripping position, the hydraulic force and the self-gripping force make the part 21 carrying the sloping face 22 fixed to the shoe 13, and the operation is similar to that which has been described above.

This condition necessitates a strong adhesion under load of the assembly (part 21 with sloping face 22 and shoe 13), which can be effected, in accordance with the invention, by very rough states of surface, grooved for example, or by strong friction linings on one of the parts 13, 21, or by an inclined coupling plane, or by any other suitable means. In this way, it is possible to apply a coupling force greater than the driving force applied by the disc 10 and this is all the more easy to effect since the coupling is static.

The shoe 13 with which the sloping face 22 is associated is adapted to come into safety application against an abutment 30 of the fixed support 11, in the case where the coupling between the said shoe 13 and the member 21 with the sloping face 22 were to give way.

By an appropriate choice of the adhesion between the shoe 13 and the member 21, it is possible to arrange either that the adhesion coupling between the two parts 13 and 21 does not give way during the whole period of normal working, which prolongs the self-gripping effect during the whole time of braking, or on the contrary that the said coupling gives way and that the shoe 13 comes into application against the fixed safety abutment 30. In this latter case, there is obtained an amplification effect with a linear characteristic. It will be noted that this amplification effect is independent of the coefficient of friction between the disc 10 and the shoe 13.

In FIG. 3, there has been designated by A the force of application of the piston 19 against the part 21, and by M the point at which the force A meets the face of the shoe 13 in contact with the disc 10, M being in the center of the shoe. B and C designate respectively the two reaction forces along the faces 26 and 28, and D the force acting on the sloping face 22 and forming the resultant of the forces B and C. According to the invention, it is arranged that the force D passes through M.

This construction prevents any rocking couple on the shoe 13 and for this reason prevents any irregular wear of the shoe 13.

The plane of fixation of the support 11 is located in the vicinity of the outer face of the member 27. The force B along the bearing surface 26 is closer to this plane than the usual abutment 30. The torsion couple which is applied on the support 11 is thus reduced. This arrangement is made possible by the fact that the shoe 13 is free from any rocking couple and that the construction as a whole tends to make the wear uniform.

The invention is of course not limited to the form of construction described and shown, but includes all its alternative forms.

What I claim is:

1. A disc brake, especially for automotive vehicles, comprising a fixed support, a rotatable disc having two opposed frictional areas, first and second friction shoes arranged on opposite sides of said disc, a transfer member mounted floatingly with respect to said fixed support and movable in a direction parallel to the disc axis and spanning the two shoes, said transfer member defining a hydraulic cylinder, piston means in said cylinder adapted to force the shoes against the two areas of the disc, an intermediate member between said piston means and the first shoe, connecting means for connecting said intermediate member with said first shoe, said fixed support having a first face rigid therewith and substantially perpendicular to said disc areas, said transfer member having a second face rigid therewith and substantially parallel to said disc areas, said intermediate member having a third face rigid therewith and extending obliquely with respect to said disc areas, and a balancing member freely disposed in contact with said three faces.

2. A disc brake as claimed in claim 1 wherein said balancing member is round in cross section.

3. A disc brake as claimed in claim 1 wherein said fixed support has an abutment in contact with said second shoe.

4. A disc brake as claimed in claim 1 wherein said connecting means yieldably connects said intermediate member with said first shoe.

5. A disc brake as claimed in claim 1 wherein said connecting means rigidly connects said intermediate member with said first shoe.

6. A disc brake, especially for automotive vehicles, comprising a fixed support, a rotatable disc having two opposed frictional areas, first and second friction shoes arranged on opposite sides of said disc, a transfer member mounted floatingly with respect to said fixed support and movable in a direction parallel to the disc axis and spanning the two shoes, said transfer member defining a hydraulic cylinder, piston means in said cylinder adapted to force the shoes against the two areas of the disc, an intermediate member between said piston means and the first shoe, spring means connecting said intermediate member with said first shoe, said fixed support having a first face rigid therewith and substantially perpendicular to said disc areas, said transfer member having a second face rigid therewith and substantially parallel to said disc areas, said intermediate member having a third face rigid therewith and extending obliquely with respect to said disc areas, and a balancing member freely disposed in contact with said three faces.

7. A disc brake as claimed in claim 6 and frictional means cooperating with said intermediate member and said first shoe for impeding slipping therebetween.

8. A disc brake as claimed in claim 6 wherein said fixed support has an abutment adapted to cooperate with said intermediate member.

References Cited by the Examiner

UNITED STATES PATENTS

| | | | |
|---|---|---|---|
| 2,655,229 | 10/1953 | Eksergian | 188—73 |
| 2,957,553 | 10/1960 | Chousings | 188—73 |
| 3,186,518 | 6/1965 | Rodway | 188—73 |

FOREIGN PATENTS

| | | |
|---|---|---|
| 1,334,544 | 7/1963 | France. |
| 788,841 | 1/1958 | Great Britain. |

MILTON BUCHLER, *Primary Examiner.*

FERGUS S. MIDDLETON, *Examiner.*

G. E. HALVOSA, *Assistant Examiner.*